United States Patent [19]
Manly

[11] 4,237,506
[45] Dec. 2, 1980

[54] POLYMODAL MAGNETIC RECORDING MEMBER

[75] Inventor: William A. Manly, Arlington, Tex.

[73] Assignee: Graham Magnetics Inc., North Richmond Hills, Tex.

[21] Appl. No.: 892,984

[22] Filed: Apr. 3, 1978

[51] Int. Cl.³ .................... G11B 5/82; H01F 10/02
[52] U.S. Cl. ................................. 360/135; 360/131; 428/900; 148/105
[58] Field of Search .................. 360/131, 134–135, 360/56–57, 59, 18; 148/103, 105, 108, 31.55; 252/62.51, 62.55; 428/900, 910

[56] References Cited

U.S. PATENT DOCUMENTS

| | | | |
|---|---|---|---|
| 3,052,567 | 9/1962 | Gabor et al. | 360/131 X |
| 3,117,065 | 1/1964 | Wootten | 360/134 X |
| 3,149,996 | 9/1964 | Wagner | 360/131 X |
| 3,185,775 | 5/1965 | Camras | 360/131 |
| 3,328,195 | 6/1967 | May | 360/131 X |
| 3,740,266 | 6/1973 | Akashi et al. | 428/900 X |
| 3,761,311 | 9/1973 | Perrington et al. | 360/134 |
| 3,943,012 | 3/1976 | Tamai et al. | 148/105 |
| 4,075,384 | 2/1978 | Suzuki et al. | 360/131 X |
| 4,075,672 | 2/1978 | Manly | 360/135 |
| 4,091,158 | 5/1978 | Kasuga et al. | 360/134 X |

FOREIGN PATENT DOCUMENTS

| | | | |
|---|---|---|---|
| 2304311 | 8/1973 | Fed. Rep. of Germany | 360/135 |
| 2403401 | 8/1974 | Fed. Rep. of Germany | 360/131 |

*Primary Examiner*—John H. Wolff
*Attorney, Agent, or Firm*—Robert A. Cesari; John F. McKenna; Andrew F. Kehoe

[57] ABSTRACT

An improved magnetic recording member of the disc type, the article of the invention is polymodal wherein one mode is formed of a first population of magnetic particles which have a coercivity differing by at least 200 oersteds from the coercivity of particles in another mode. These latter particles are, preferably, metallic magnetic particles oriented in a vertical direction and are in a thin layer over said first population of magnetic particles. This combination overcomes existing limitations on (a) disc products, and (b) the preferred metallic particles heretofore known.

7 Claims, 4 Drawing Figures

VERTICAL ORENTING MAGNETS

POLYMODAL MAGNETIC RECORDING MEMBER

BACKGROUND OF THE INVENTION

This invention relates to improved magnetic recording media of the type that are known as discs and is particularly advantageous when embodied in those flexible disc products known as floppy discs as well as polymodal.

In reading the following discussion of the background of the invention, it must be remembered that the discussion has been prepared with a full knowledge of the invention. It cannot be, and is not intended to be, a view of the existing and as apparent to one of ordinary skill in the art at a time preceding the invention.

The magnetic recording members, subject of this invention, comprise a coating of magnetic particles in a matrix such as an organic polymer matrix. There are two general kinds of such members. A first kind is typified by the most common type of magnetic tape. This kind of product moves in a longitudinal direction in relationship to a recording or reading head because information is recorded sequentially along the length of the medium. The other kind of product is a disc which rotates while the reading head is positioned radially or helically, much in the relationship of a needle on a phonograph disc. These products are very well recognized in the art and have each been in extensive commercial use for some time. There has been a great deal of effort expended over the last thirty years or so to improve the magnetic recording characteristics of such products. One such procedure has been the orientation of the magnetic particles within their matrix. A discussion of such orientation is presented in *The Physics of Magnetic Recording* by C. D. Mee; 1968; North-Holland Publishing Company, Amsterdam. Both longitudinal and vertical orientation is discussed. Longitudinal orientation is orientation along the direction of travel of the recording member, e.g. along a tape. Vertical orientation would be the same particles "standing up" on end, i.e. normal to the tape surface. Mee points out that use of orienting techniques is not indicated for applications such as magnetic discs "which require tape to be magnetized in different directions." Among additional publications disclosing various orientation techniques and procedures are U.S. Patents 3,052,567 to Gabor et al; 3,185,755; 2,796,359; 3,256,112; 3,117,065; 2,711,901; 3,261,706; 3,065,105 and 3,627,680. U.S. Pat. Nos. 3,117,065; 3,052,567 and 3,185,775 discuss vertical orientation of magnetic particles. There is somewhat related art, typified by U.S. Pat. No. 3,001,891, wherein an AC orienting field is used to allow a "free" orientation of particles in response to other fields.

In some known art, discs have included oriented particles. This is especially true of inadvertent radial orientation of rigid (as opposed to floppy) spin-coated magnetic discs. Also, U.S. Pat. Nos. 3,256,112 and 3,001,891 disclose the use of an orienting procedure and state that discs may be oriented. In such a procedure, the particles have always been oriented in a circular direction, i.e. in a direction directly analogous to the longitudinal direction in tapes.

The flexible articles known as floppy discs are formed on a coating apparatus exactly like magnetic tape, then cut into circular discs. Such discs carry unoriented particles and cannot take advantage of any high magnetic squareness attributes of said particles. One example of such a disc format is described in "IBM Diskette, Original Equipment Manufacturers' Information" Product Reference Literature Number GA21-9190-1, File GENL-19 available from IBM Corporation.

In still another area of the magnetic recording art, there has been a great deal of attention paid to the development of superior magnetic particles. Usually such particles are cobalt-based metal particles like those disclosed in U.S. Pat. Nos. 3,909,240 to Deffeyes et al; 3,574,685 to Haines et al; and 3,607,218 to Akashi et al. Such particles can be utilized in providing much superior magnetic recording members than are possible using the traditional iron oxide or "chromium dioxide" particles. However, it is difficult to form magnetic recording members which fully exploit the potential of the improved metallic particles on commercial mixing coating equipment operated at acceptable output rates.

A major problem, in this respect, is the adequate dispersal of such powders. A number of inventors have provided improved means for dispersing such particles more efficiently. For example, U.S. Pat. No. 3,026,215 suggests the lengthwise and breadthwise orientation of such particles. Manly, in U.S. Pat. No. 3,172,776 discloses a process wherein chains of metal particles are formed to facilitate their being adapted more readily to an orienting procedure. A somewhat similar suggestion is made in U.S. Pat. No. 3,228,882 to Harle et al. Akashi et al, in U.S. Pat. No. 3,740,266 suggests still another method for overcoming problems inherent in orienting the more acicular of said particles.

While the problem of coating defects has slowed down the commercial application of such metal powders in magnetic tape, especially magnetic tapes of the polymodal type, it has been a particular barrier to using the powders in floppy discs wherein a defect in the coating will necessarily cause a large area of processed tape to be discarded.

In the disclosure set forth below, the inventors will describe in improved magnetic disc and process for making the same. The novel disc product embodies attributes substantially overcoming the limitations of the disc products described above. Appicants, in solving the problem associated with such discs, have discovered a general solution to the roping problems heretofore associated with both acicular particles and small metallic particles, a solution useful in both disc and tape products. Also of interest in the prior art are magnetic powder combinations used as polymodal materials and disclosed in copending and commonly owned U.S. Patent Application, Ser. No. 411,253 filed Oct. 31, 1973 by Deffeyes.

That application discloses a system based on the use of a magnetic identification medium formed of at least two distinct populations of ferromagnetic powders, wherein a first population is selected so that it can be magnetically switched, i.e. recorded upon, by a magnetic field at which a second population will not be switched. Each population is also responsive to differing stimuli, say, differing magnetic fields or temperatures, for erasing information therefrom; that is, magnetic information can be retained by one population as magnetic information is erased from another population. Such systems are referred to herein as polymodal systems. It is not intended to include within the term "polymodal" those systems which have a supplemental magnetic coating only for the purpose of enhancing a signal as opposed to bearing a separate signal.

In general, it is desirable to have populations in a bimodal system characterized by coercivity values which have a difference of at least 200. In practice, bimodal systems may be selected to have differences of 1000 or greater. If additional functionality is built into a ferromagnetic system by adding different modes, the higher and lower coercivities will usually differ by at least a factor of 200 (X−1), wherein X is the number of modes, and it will be advantageous to keep the coercive force difference between the different populations at 200 oersteds or more.

The discovery that certain combinations of powders can be utilized in achieving such distinctly polymodal ferromagnetic systems was unexpected in view of the performance of mixtures formed of the ferromagnetic powders most generally used in the art. For example, a mixture formed of a first iron oxide, a second iron oxide and cobalt-based metal powders having coercivities of 180, 320, and 1000, respectively, yielded a low coercivity peak which was not distinct although there were distinct peaks between the low coercivity materials and the high coercivity material.

The above result may be partly understood in view of the teaching that the peaks should be about 200 oersteds apart. However, the two low coercivity powders interact more than would be expected on the sole basis of the insufficient difference in coercivities.

In general, it appears that the metal powders, i.e. those of Bm values exceeding about 8000 gauss, are the most advantageous for use in forming bimodal systems, in that they can be used successfully in combination with oxides and other metal powders.

Some typical Bm values are 3400 for gamma $Fe_2O_3$, 4000 for black $Fe_3O_4$, about 16,000 for the cobalt metal powder of Example 1 below and about 13,000 for the low coercive force metal powder of Examples 2 and 3.

In general, the peaks visible on a non-integrated dM/dt curve of an advantageous polymodal system can usually be recognized in two ways:

1. As one raises the field on a BH meter the peak of the lower coercivity curves will be substantially complete before the appearance of the next higher curve.

2. The valleys between adjacent peaks are advantageously of a depth equal to at least one-half of the average height of the adjacent peaks over a base line.

Previously it has been known, or at least alleged to have been known, to make multi-layer bimodal magnetic tapes using thin films of plated metal. Such recording media, disclosed in U.S. Pat. Nos. 3,328,195 and 3,219,353 to May and Prentky, give little or no evidence that any high performance bimodality was achieved. In any event, manufacture of the May and Prentky products require relatively expensive, multi-layer construction and also utilize metallic films, the formulation and design of which are not only very complex and expensive, but depend for their magnetization upon different considerations, e.g. the controlled movement of domain walls, than do magnetic particles dispersed in a resin matrix. Moreover, such films are not readily varied as to composition and are not believed as susceptible to enhancement of recording properties by use of bias currents because eddy currents seem to be induced, possibly because of the relatively high conductivity of metal films.

Other deficiencies in the bimodal materials of Prentky and May are the necessity of using very large coercivity differences. Trimodal or quatramodal media become economically and technically impractical using their processes and product.

Moreover, it appears that Prentky and May had no idea that materials, or at least those exhibiting substantial shape anisotropy could be used in polymodal materials. The Prentky and May materials exhibit little or no shape anisotropy although they exhibit a great deal of magnetic interaction because of the nature of domain-wall-modulated magnetic recording.

It is further noted that in an article entitled "*The Effect of Particle Interaction on the Coercive Force of Ferromagnetic Micropowders*" (Proceedings of the Royal Society, A, 232 (1189), pages 208–226, 1955), Wohlfarth discloses that "the change of coercive force with packing is negligible for powders controlled by magnetocrystalline anisotropy . . . but is significant for particles controlled mainly by shape anisotropy." This statement is related to the present invention only by a hindsight search for a theory by which to further explain some of the unexpected and advantageous attributes of the products of the invention.

In further hindsight review of art bearing some relationship to fields relating in some superficial structural or utilitarian aspect to the invention, the following art was located:

U.S. Pat. No. 3,601,913 to Pollock suggests a device utilizing a mixture of high and low coercivity materials. The utility of this system depends on the detection of magnetic voids caused by mechanical displacement of magnetic powder bearing surfaces. Pollock also suggests that use of such mixtures will make card counterfeiting more difficult. But Pollock uses his mixture only to complicate the manipulative acts of duplicating a card; the individual components serve no distinct functions except in instances wherein they are at least partly non-congruent so that they yield a visually-identifiable pattern or a geometrically distinct identifying pattern formed of one of the magnetic powders. In general, the powders simultaneously resond to the field as a single-population powder would.

Moreover, the chromium oxide and iron oxide mixture of the Pollock patent would be inoperable in forming combinations for use in such processes as are to be described below.

U.S. Pat. No. 3,790,754 to Black teaches use of adjacent ferromagnetic coatings to achieve a multi-modal, but relatively insecure magnetic recording system. The system is generally similar to Pollock's system.

In recently-issued U.S. Pat. No. 3,761,311 to Perrington et al, there is described a dual layer magnetic tape, each layer having different nominal coercivities. It is believed that such a tape is sold under the trade designation Scotch Brand C-60 Cassette Cobalt-Energized High-Energy type (Catalog Number S-C-60ME) by 3M Company. That tape is not bimodal, probably because magnetic interactiion substantially pervades the ultra-thin layer of the tape. Moreover, since it was developed for, and is sold to, a specific audio recording market, it is clearly not intended for, nor tolerant of any substantial bimodal character.

In the following description, the term "card" will be used in the same sense of a mechanical equivalent of any article which carries magnetic material in information-yielding arrangement. It will be obvious that the scope of the kinds of members which can be tagged with magnetic identification means is very broad and that such recording members are mechanical equivalents to the credit card referred to in this application.

Also, U.S. Pat. Nos. 3,986,205 and 3,986,206 to Fayling, based on applications filed subsequently to the parent application of Applicant, describe a special mode of bimodality whereby particular magnetic particles such as barium ferrite are utilized in a particular way to form bimodal materials. Barium ferrite is a peculiar material exhibiting a very high coercivity in one direction in comparison to the coercivity exerted in a direction normal thereto. The coercivity ratio is about 2.5:1 whereas the ratio in most magnetic materials is below 1.5:1 and usually about 1.25:1. This large difference in coercivity allows Fayling, using special processing procedures, to achieve a polymodal recording system having at least some polymodal characteristics.

Fayling utilizes his barium ferrite and like materials as one component of a polymodal system. Fayling's polymodal recording media cannot be processed in the usual way, i.e. using a single ring type erase-head of the type normally used in the magnetic recording art. This is true with respect to tape processing. Moreover, a spatially large erase field must be used in processing a credit card-sized object by the Fayling system.

Finally, Fayling's system does not appear to be useful on magnetic discs without the development of wholly new processing procedures.

It should also be noted that both operable powder populations of Fayling are believed to exhibit shape anisotropy. This is a consequence, it is believed, of chip-like barium ferrite flakes (normally not having shape anisotropy) aligning themselves into a "stack" formed of a plurality of the chips when they are mixed and oriented in a polymer matrix.

U.S. Pat. No. 3,566,356 to Holm et al discloses some magnetic recording media using two magnetic materials in the same composition. However, the purpose of these inventions is to provide a positive interaction between the two populations to assure a characteristic and distinctive coercivity characteristic. Holm et al also appear to disclose some two-layer particulate magnetic materials which seem to be capable of some bimodal performance. This Holm et al bimodality requires a difference in coercivity but the characteristic is achieved by cross-orienting two layers of iron oxide.

SUMMARY OF THE INVENTION

It is an object of the present invention to provide improved magnetic recording members which exhibit an improved utilization of potential properties of magnetic particles.

Another object of the invention is to provide improved bimodal floppy discs.

Another object of the invention is to provide improved bimodal magnetic recording media.

Further objects of the invention are to provide novel processes by which the aforesaid discs and other recording media are made.

Still another object of the invention is to provide improved magnetic recording members using metallic powders, especially bimodal recording media using high cobalt-alloy powder of excellent squareness.

Other objects of the invention will be obvious to those skilled in the art on their reading of this disclosure.

The above objects have been substantially achieved by the construction of an improved recording member using vertical orientation in the manufacture of discs or using vertical orientation in the manufacture of recording media using metallic particles.

Particular advantage is achieved when such orientation is used in conjunction with metallic particles of the type which tend to align and "rope" when subject to magnetic orientation procedures.

The invention allows the manufacture of floppy discs which have an increased output signal over present media of up to about 3 decibels with iron oxide and an increase from about 5 up to about 12 decibels with the best metal particles. Like improvements can be achieved using such known magnetic fillers as cobalt-doped iro oxide and chromium dioxide.

Moreover, for the first time, it is possible to approximate in a practical magnetic recording media, the performance which is believed to be ultimately possible with metallic particles, especially those particles comprising 50% or more by mass of iron or cobalt, and to do so while utilizing a relatively small quantity of such particles. This is apparently possible because the magnetic-particle-bearing coating in a vertically oriented member can be limited to a coating so thin, e.g. about 100 micro-inches thick, that roping is found to be effectively prevented. In the most efficient utilization of the invention, the coating will be from 30 to 80 microinches in thickness.

In disc applications, there is another important processing advantage which is found to favor the use of vertically oriented magnetic particles: There is often a single head used for reading and recording. In such cases, the gap required for reading controls the single head design. Thus, a relatively short head gap is already used in such applications and vertically oriented coatings are found to be particularly advantageous.

Moreover, the most such applications utilize rather short wave lengths; those best utilized with a thin, vertically oriented coating.

FIG. 1 shows a magnetic field configuration near the write head gap.

FIG. 2 illustrates the same head a shown in FIG. 1 with a magnetic coating moving from left to right with respect to the head.

Figure 1:
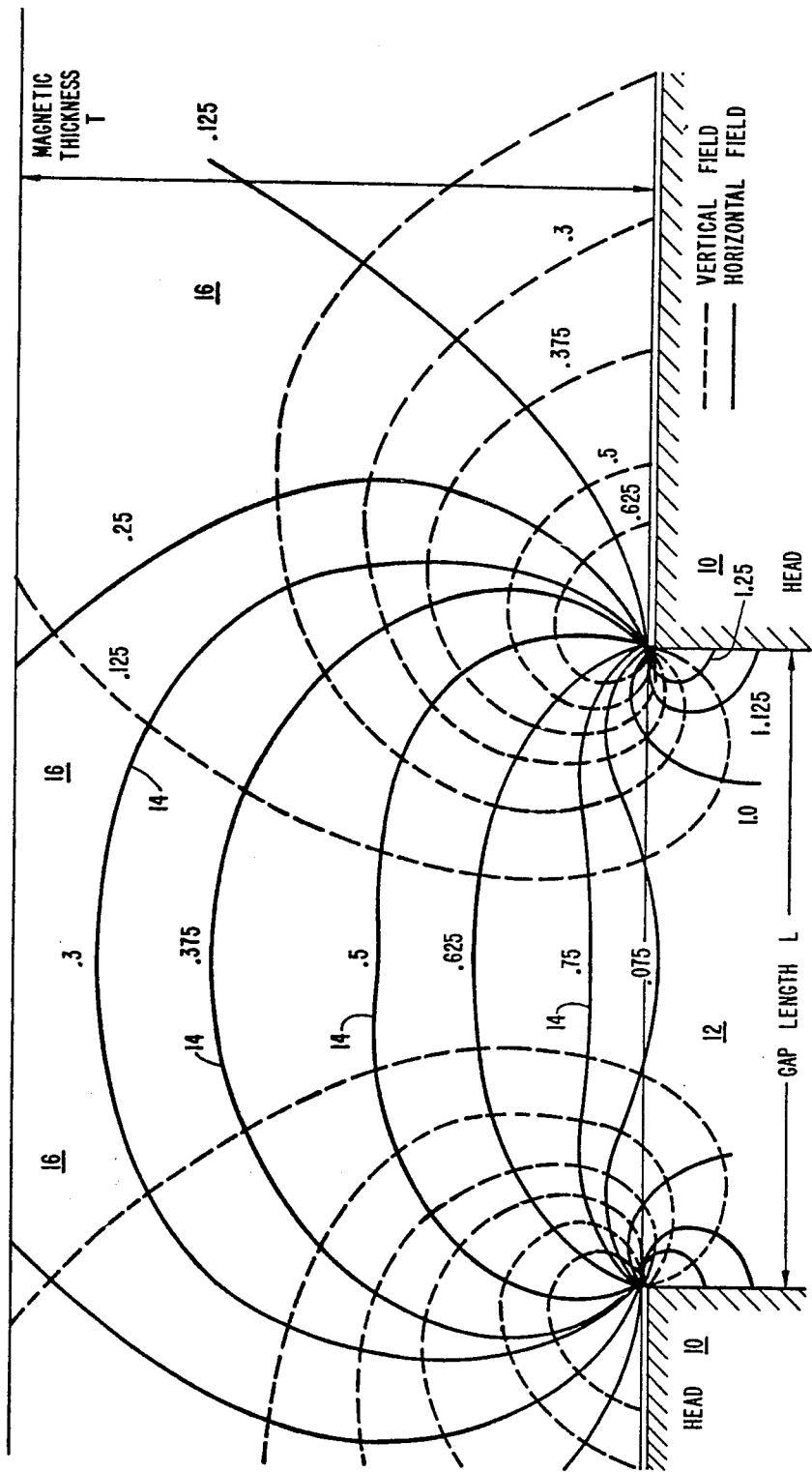
FIGS. 1 and 2 are schematic diagrams illustrative of the vertical orienting rationale helpful in understanding the present inventions.

FIG. 1 illustrates write head 10 having a gap 12. The magnetic field of head 10 is illustrated, in its normal condition, by a series of lines 14 wich generally approximate the strength of the field at varying distances from gap 12. On each line 14 is a numerical designation of the field strength as a fraction (decimal equivalent) of the strength of the field in the gap, i.e. the so-called "deep-gap field." A magnetic coating 16 is shown in relationship to the gap and has, roughly a depth equal to the gap width itself, i.e. about 100 microinches or 0.1 mil.

Figure 2:
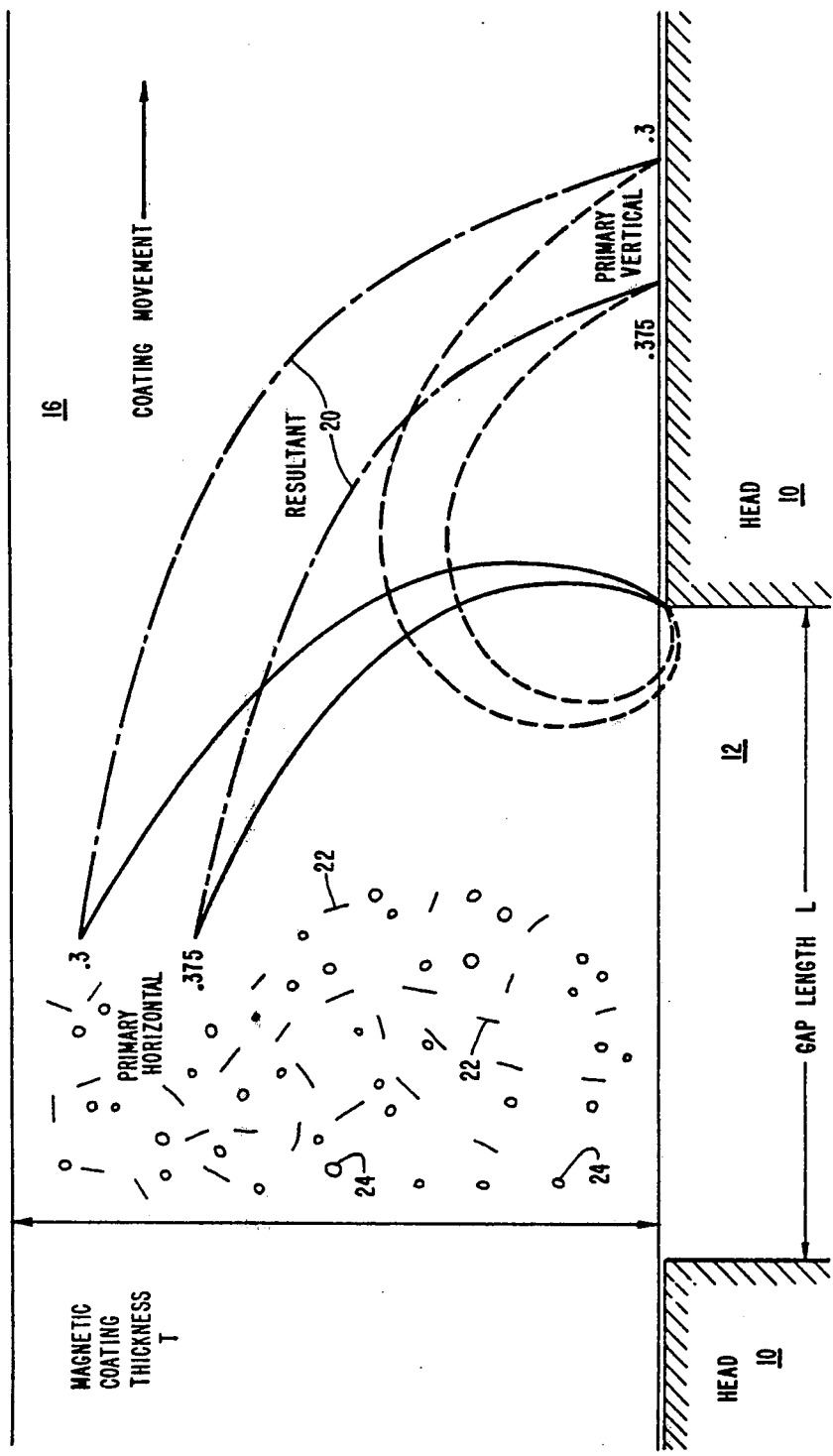

FIG. 2 illustrates the same apparatus shown in FIG. 1, except the recording member 16 is moving from left to right across the recording gap 12. The deep-gap field, for demonstration purposes, is taken so that recording is taking place between field limits of 0.3 and 0.375. It will be noted that the field portions represented in this range are primarily vertical near the head but primarily horizontal in volumes of the coating which are deeper than about 70–80 microinches from the head in the magnetic coating. A resultant field 20, i.e. the field formed by the horizontal and vertical components of the field, is also illustrated in FIG 2.

When one is primarily interested in short-wavelength parts of the magnetic recording spectrum, as is the case when one is recording digital information, substantially all of the information-storing-and-retrieval process can be carried out in the surface region (near the head) of the magnetic coating. For digital signals which are fairly high in density, one will achieve better resolution, high output, and higher bit densities with the higher squareness, vertically oriented particles as is described herein.

In a particularly favorable embodiment of the invention, one can utilize a polymodal embodiment, i.e. a embodiment using at least one additional magnetic particle population in a layer adjacent to, or intermixed with, the vertically aligned population. These added populations may or may not themselves be vertically aligned. Such polymodal embodiments wherein particulate magnetic powders are used, should preferably have powders selected so that there is a difference in coercivity of about 200 oersteds or more and one of the powders should preferably be metallic, exhibiting a Bm value of 8000 gauss or more. Thus, a metal such as iron, cobalt, and the like; e.g. the cobalt-iron-nickel alloy sold for magnetic tapes by Cobaloy Company, a division of Graham Magnetics Incorporated, can be advantageously combined with gamma iron oxide or chromium dioxide. In floppy discs used in storage of digital information, the space taken up by such ancillary information as required for addressing and indexing of the "hard data" is up to two-thirds of the available disc area. When this ancillary information space is placed in a second mode, substantive digital information can be increased substantially. This advantage can be improved several times again because of the use of vertically oriented particles. Moreover, the orientation procedure itself helps to achieve an improved functional separation of the different recording modes.

In manufacture of vertically oriented discs, particles having a squareness value of 0.65 may be used advantageously. However, the particles which exhibit squareness values of from 0.72 to 0.9 or higher, are preferred.

In making a bimodal disc of the general type being described, a number of possible choices exist. For example, the different magnetic particles can be coated together in one layer or segregated into two layers. If two layers are used, either material may be on top.

In practice, single layer, polymodal coatings are most economical. This is particularly true when one wishes to take advantage of the relatively thin coatings which are useful with the process of the invention. Indeed, the combination of a thin coating and vertical orientation, made possible by the process of the invention, results in a superior bimodal product. In a most advantageous embodiment of the invention, say where digital information is carried on a disc, the "address" information is preferably carried on the high coercivity material nearer the surface of the disc substrate. The temporary information would be carried on the lower coercivity material nearer the top of the disc. FIG. 2 shows schematically high coercivity particles and low coercivity particles dispersed in the same media. It is to be understood that most of the recording will occur in the vertically oriented section of the coating.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as maybe best suited in the condition of a particular case.

EXAMPLE 1

Metal powders may be advantageously incorporated into magnetic tape utilizing many different polymer systems. One such system would comprise 77 parts, by weight, of the metal powder product which is acicular metal powder having an average particle size of about 0.5 micron by about 0.15 micron. It is formed of 18 parts nickel, 18 parts iron and 64 parts cobalt. Such a powder may be obtained from the Cobaloy Company, a division of Graham Magnetics Incorporated. Such a powder is typically characterized by a squareness value of 0.84, a coercive force of 659 oersteds, and a specific magnetic moment of about 138 emu per gram. Also included are parts soya lechthin, 19 pounds of the pre-polymerized polyurethane resin sold under the trade designation Estane 5707 by B. F. Goodrich Co., and as described in U.S. Pat. No. 2,871,128 to Schollenberger. Other additives would normally be added. These additives are known to those generally skilled in the art, and include fungicides, and the like. Two parts, by weight, of butoxyethyl stearate and 0.1 part, by weight, of diphenyl mercury would be suitable adjuvants for the formulation given above. The formulation, when adequately mixed, would be coated along a substrate such as a polyethylene terephthalate polymer film substrate at a wet thickness selected to yield an 80 microinch (dry) coating of magnetic coating composition on the film after the composition is dried.

Figure 4:
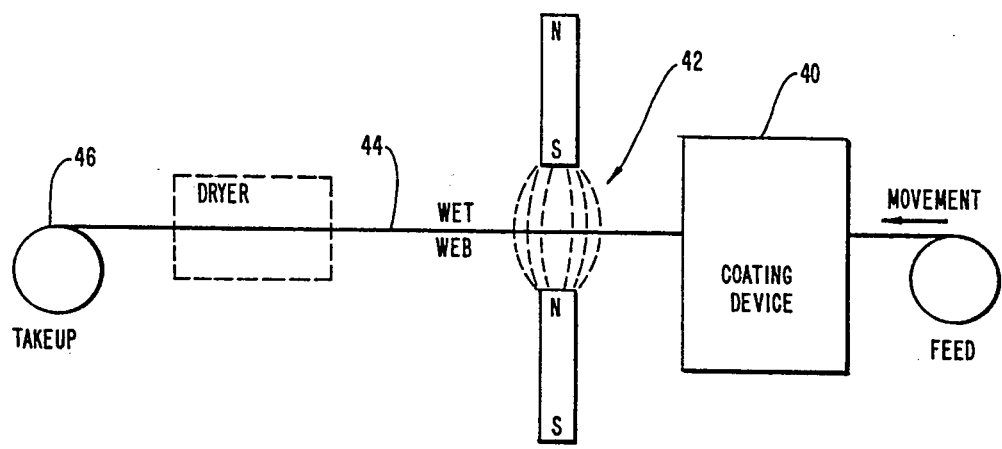
FIG. 4 is a schematic diagram of a process line wherein a magnetic recording web is being vertically oriented.

After coating, but before drying, the coating is subjected to a magnetic field which is everywhere normal to the surface of the web. FIG. 4 indicates, schematically, one such system which results in such a field but other systems can be used. For example, the field is about 3 times the coercive force of the metal particles used in the tape. The field may be continuously applied, pulsed, alternating, or a combination of these. If a combination, one component might be of a lower value, e.g. 1.5 times the coercive force of the particle than that given above.

After the vertical orienting is accomplished, the web is dried. Part of the dried web is cut into "vertically oriented" circular floppy discs, and then packaged in the manner usual for such products. A part of the web is also slit into continuous ribbons to form "vertically oriented" magnetic tape.

EXAMPLE 2

The above example is repeated using gamma iron oxide of the type sold under the trade designation HR280 by Hercules Corporation as the particle. The composition is as follows:
Polyurethane Estane 5707—15,75

Polyester G.P85-1030E—2.25
Phenoxy Resin—4.50
Magnetic Pigment—72.00
Carbon Black—3.50
Wetting Agent—1.5
Tetrahyydrofuran—185.00
Miscellaneous Adjuvants—0.05

EXAMPLE 3

Example 2 is repeated, using magnetic chromium oxide of the type sold by E. I. DuPont. A particle size of about 1 micron is selected and the volume of filler is maintained at the same level as for iron oxide in Example 2.

EXAMPLE 4

Example 1 is repeated using, instead of the magnetic fillers of Example 1, a substitute filler sufficient to equal the same volume percentage loading in the coating compostion as the magnetic filler of Example 1. This substitute filler itself comprises 40%, by weight, of the iron oxide of Example 2 and 60%, by weight, of the cobalt alloy of Example 1.

The resulting magnetic coating composition was coated onto the substrate in a coating selected to yield a 110 microinch (dry) coating.

The resultant tape is bimodal medium suitable, for example, for use in a procedure wherein basic information is maintained in the high coercivity, cobalt alloy mode and wherein different, independently erasable information, or an interference pattern is carried by the iron oxide mode.

Figure 3:
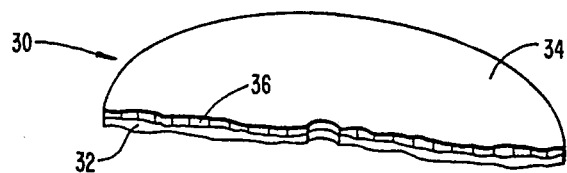
FIG. 3 is a schematic fragment of a bimodal floppy disc prepared according the invention.

FIG. 3 illustrates a fragment of a floppy disc 30 which comprises a polymeric film base sheet 32 and a magnetic coaing 34. This coating comprises vertically oriented particles of cobalt alloy magnetic powder 36 near the surface of the disc.

FIG. 4 illustrates the manufacture of a tape web according to the invention showing movement of the web 44 from a coating device 40, through a magnetic orienting magnets 42, through a drier 44 onto a take-up roll 46.

In general, the peaks visible on a non-integrated dM/dt curve of an advantageous polymodal system can usually be recognized in two ways:

1. As one raises the field on a BH meter the peak of the lower-coercivity curves will be substantially complete before the appearance of the next higher curve.

2. The valleys between adjacent peaks are advantageously of a depth equal to at least one-half of the average height of the adjacent peaks over a base line.

Polymodal recording members of the type described herein are new. The name has been selected to describe a device which has the ability to carry at least two independently-functioning magnetic signals in a given plane (e.g. in a given coating containing two different ferromagnetic powder populations) or in proximate and congruent planes (e.g. in adjacent layers of ferromagnetic materials or two such layers that are separated by a thin sheet of barrier material.)

The above-described examples disclose bimodal systems which are not only advantageously polymodal in the functional sense, but are also advantageous in that they are formed of magnetic materials which do not have extraordinary ratios of coercivity measured at different axis. The exemplified materials have ratios from any harder axis to any soft axis of about 1.25 or less. Moreover, the devices disclosed herein can be used with conventional state of the art erasing means because magnetic fields of markedly different directional parameters are not required for erasing each mode.

It is to be understood that the following claims are intended to cover all of the generic and specific features of the invention herein described and all statements of the scope of the invention which might be said to fall therebetween.

I claim:

1. In a polymodal magnetic recording member of the circular floppy disc type characterized by a polymodal combination of at least two population of magnetic particles the combination of which exhibits an unintegrated dM/dt curve having peaks separated by valleys of a depth equal to at least one-half of the average height of the adjacent peaks over the base line, the improvement comprising a magnetic-recording coating having ferromagnetic particles in an organic resin binder, and said coating being up to about 100 microinches thick and comprising one population of magnetic particles, vertically-oriented within an upper zone and preferentially responsive to vertical magnetic flux lines in said zone, and wherein said vertically-oriented particles exhibits a squareness in the direction normal to the surface of the medium of at least about 0.65; and said coating also comprising, in addition to said vertically-oriented particles of at least one other magnetic material, which are preferentially responsive to a horizontal flux of a magnetic field in a lower zone, and which have a coercivity differing by at least 200 oersteds from said coercivity of said vertically oriented particles thereby enhancing the independent switching characteristics of each particle population in the polymodal combination.

2. A polymodal magnetic recording medium as defined in claim 1 wherein said vertically oriented particles are metallic particles having a Bm value of over 8000 oersteds and wherein said other magnetic material has a coercivity difference of at least 200 oersteds from the coercivity of said metallic particles.

3. A magnetic recording medium as defined in claim 2 wherein said metallic particles are formed of a cobalt alloy.

4. A recording member as defined in claim 3 wherein said cobalt alloy particles have a squareness of at least about 0.72 in the direction normal to the surface of the medium.

5. A magnetic recording member of the type defined in claim 1 wherein said vertically oriented particles are cobalt alloy particles and have a squareness of at least about 0.72 in the direction normal to the surface of the member.

6. A recording medium as defined in claim 1 wherein said vertically oriented particles are concentrated in a zone less than about 100 microinches thick and are particles of a squareness of at least about 0.72 measured in the direction normal to the surface of the medium.

7. A recording medium as defined in claim 1 wherein said vertically oriented particles comprise at least 50% by weight of iron and cobalt, or a mixture of iron and cobalt.

* * * * *

UNITED STATES PATENT AND TRADEMARK OFFICE
CERTIFICATE OF CORRECTION

PATENT NO. : 4,237,506
DATED : December 2, 1980
INVENTOR(S) : William A. Manly

It is certified that error appears in the above-identified patent and that said Letters Patent are hereby corrected as shown below:

```
Title Page [73], second line, "Richmond Hills, Tex."
                  should read --North Richmond Hills, Tex.--
Fig. 2, Sheet 2 of 3, "primary" should read "primarily",
                  both occurrences.
Col. 1, line 15 "and" should read --art--
Col. 2, line 43 "Appicants" should read --Applicants--
Col. 4, line 39 "resond" should read --respond--
Col. 4, line 56 "interactiion" should read --interaction--
Col. 6, line 11 "iro" should read --iron--
Col. 6, line 33 "moreover, the most" should read --moreover most--
Col. 6, line 42 "a shown" should read --as shown--
Col. 6, line 46 "according the" should read --according to the--
Col. 6, line 52 "wich" should read --which--
Col. 8, line 30 "lechthin" should read --lecithin--
Col. 8, line 68 "15,75" should read --15.75--
Col. 9, line 6  "Tetrahyydrofuran" should read --Tetrahydrofuran--
Col. 9, line 35 "coaing" should read --coating--
```

Signed and Sealed this

Twenty-eighth Day of April 1981

[SEAL]

Attest:

RENE D. TEGTMEYER

Attesting Officer     Acting Commissioner of Patents and Trademarks